(12) United States Patent
Becker et al.

(10) Patent No.: US 8,002,473 B2
(45) Date of Patent: Aug. 23, 2011

(54) SEALED SPLIT RING CRANKSHAFT BEARING

(75) Inventors: Edward P. Becker, Brighton, MI (US);
Anil K. Sachdev, Rochester Hills, MI (US); Emerson J. Adams, Sterling Heights, MI (US); Thomas A. Perry, Bruce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 625 days.

(21) Appl. No.: 12/130,034

(22) Filed: May 30, 2008

(65) Prior Publication Data

US 2009/0297079 A1 Dec. 3, 2009

(51) Int. Cl.
*F16C 33/76* (2006.01)
*F16C 9/00* (2006.01)

(52) U.S. Cl. ........ 384/477; 384/130; 384/250; 384/273; 384/457; 384/570

(58) Field of Classification Search ............... 384/288, 384/290, 307, 457, 474–475, 477, 501–502, 384/570, 542, 130, 250, 273; 277/355, 361, 277/403, 408; 123/59.7, 195 R
See application file for complete search history.

(56) References Cited

U.S. PATENT DOCUMENTS

| | | | | |
|---|---|---|---|---|
| 1,790,253 A * | 1/1931 | Taylor | | 384/457 |
| 2,283,022 A | 5/1942 | Wallgren | | |
| 2,288,651 A * | 7/1942 | Ture et al. | | 74/597 |
| 2,441,294 A * | 5/1948 | Shafer | | 384/475 |
| 2,532,795 A * | 12/1950 | Underwood et al. | | 384/288 |
| 2,850,311 A * | 9/1958 | Mansfield | | 277/547 |
| 3,059,625 A * | 10/1962 | Torre | | 123/59.7 |
| 3,190,144 A * | 6/1965 | Helmut | | 74/597 |
| 3,230,023 A * | 1/1966 | Dahl et al. | | 384/570 |
| 3,311,429 A * | 3/1967 | Kocian | | 384/475 |
| 3,446,542 A * | 5/1969 | Whitehurst | | 384/477 |
| 3,929,395 A * | 12/1975 | Stojek | | 384/432 |
| 4,175,801 A * | 11/1979 | Coil et al. | | 384/429 |
| 5,186,547 A * | 2/1993 | Muhl et al. | | 384/484 |
| 5,462,366 A * | 10/1995 | Hausler | | 384/457 |
| 5,468,074 A * | 11/1995 | Godec et al. | | 384/498 |
| 5,630,669 A * | 5/1997 | Stewart | | 384/570 |
| 6,177,644 B1 * | 1/2001 | Wilkie et al. | | 219/69.17 |
| 7,270,484 B2 * | 9/2007 | Waseda | | 384/570 |
| 7,703,432 B2 * | 4/2010 | Shaffer | | 123/197.4 |
| 7,866,891 B2 * | 1/2011 | Waseda et al. | | 384/457 |

FOREIGN PATENT DOCUMENTS

| | | | | |
|---|---|---|---|---|
| CH | 565327 A | * | 8/1875 | |
| DE | 2711938 A1 | * | 9/1977 | |
| GB | 1394253 A | * | 5/1975 | |
| JP | 2007198496 A | * | 8/2007 | |

* cited by examiner

*Primary Examiner* — Marcus Charles

(57) ABSTRACT

A crankshaft has spaced-apart cheeks and a cylindrical surface between the cheeks. A split ring bearing assembly has first and second bearing parts that join to encircle the cylindrical surface. First and second split ring seal assemblies each have first and second seal parts that join to encircle and sealingly contact with the cylindrical surface on each side of the split ring bearing assembly. A journal includes a first and second journal halves having cylindrical recesses receiving the crankshaft so that the split ring bearing assembly bears upon the journal and the first and second split ring seal assemblies sealingly contact with the journal halves. A lube fill fitting is provided in the journal for the introduction of lubricant which is permanently sequestered between the first and second split ring seal assemblies to provide sealed lubrication of the split ring bearing assemblies.

20 Claims, 5 Drawing Sheets

US 8,002,473 B2

SEALED SPLIT RING CRANKSHAFT BEARING

FIELD OF THE INVENTION

The present invention relates to an improved low-friction and permanently lubricated crankshaft bearing assembly for an engine, and more particularly a split ring bearing assembly which is sealed and permanently lubricated.

Modern motor vehicle engines have an engine crankcase that rotatably mounts a crankshaft on bearings. Pistons reciprocate within the crankcase and are connected to the crankshaft by connecting rods. Bearings are provided between the crankshaft and the connecting rods, and between the crankshaft and the crankcase. These bearings are lubricated by crankcase oil which is stored in an oil pan. In modern engines, an oil pump is provided to distribute the crankcase oil through oil passages provided in the crankshaft in order to lubricate the various bearings. In other engine designs, the crankshaft is dipped into the crankcase oil upon rotation of the crankshaft, creating a splash which distributes crankcase oil to the bearings.

A disadvantage of the foregoing bearing lubrication systems is that the oil that is stored in the oil pan is subject to impurities that result from combustion by-products that leak past the piston seals. It would be desirable to provide an improved low friction connection between the crankshaft and the crankcase and the connecting rods in order to improve fuel economy, and it would also be desirable to sequester the bearings in order to enable permanent lubrication of the bearings and maintain the bearings free of exposure to the impurities in the crankcase oil.

SUMMARY OF THE INVENTION

A low friction sealed connection between a crankshaft and a journal is provided. The crankshaft has spaced-apart cheeks and a cylindrical surface that is exposed between the cheeks. A split ring bearing assembly includes a first bearing part and a second bearing part that when joined together will encircle the cylindrical surface. Each bearing part has a plurality of bearing elements, either rollers or balls, adapted to bear upon the cylindrical surface of the crankshaft. First and second split ring seal assemblies each have a first seal part and a second seal part that when joined encircle and sealingly contact with the cylindrical surface of the crankshaft. The first split ring seal assembly is installed on one side of the split bearing assembly and the second split ring seal assembly is installed on the other side of the split bearing assembly. The journal includes a first journal half having a cylindrical recess for receiving the crankshaft and a second journal half to capture the crankshaft in the cylindrical recess of the first journal half so that the bearing elements of the split ring bearing assembly bears upon the journal and the first and second split ring seal assemblies sealingly contact with the first journal half and the second journal half. A lube fill fitting is provided in the journal for the introduction of lubricant which is permanently sequestered between the first and second split ring seal assemblies to provide sealed lubrication of the split ring bearing assemblies.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE EXEMPLARY EMBODIMENTS

The following description of certain exemplary embodiments is merely exemplary in nature and is not intended to limit the invention, its application, or uses.

Figure 1:
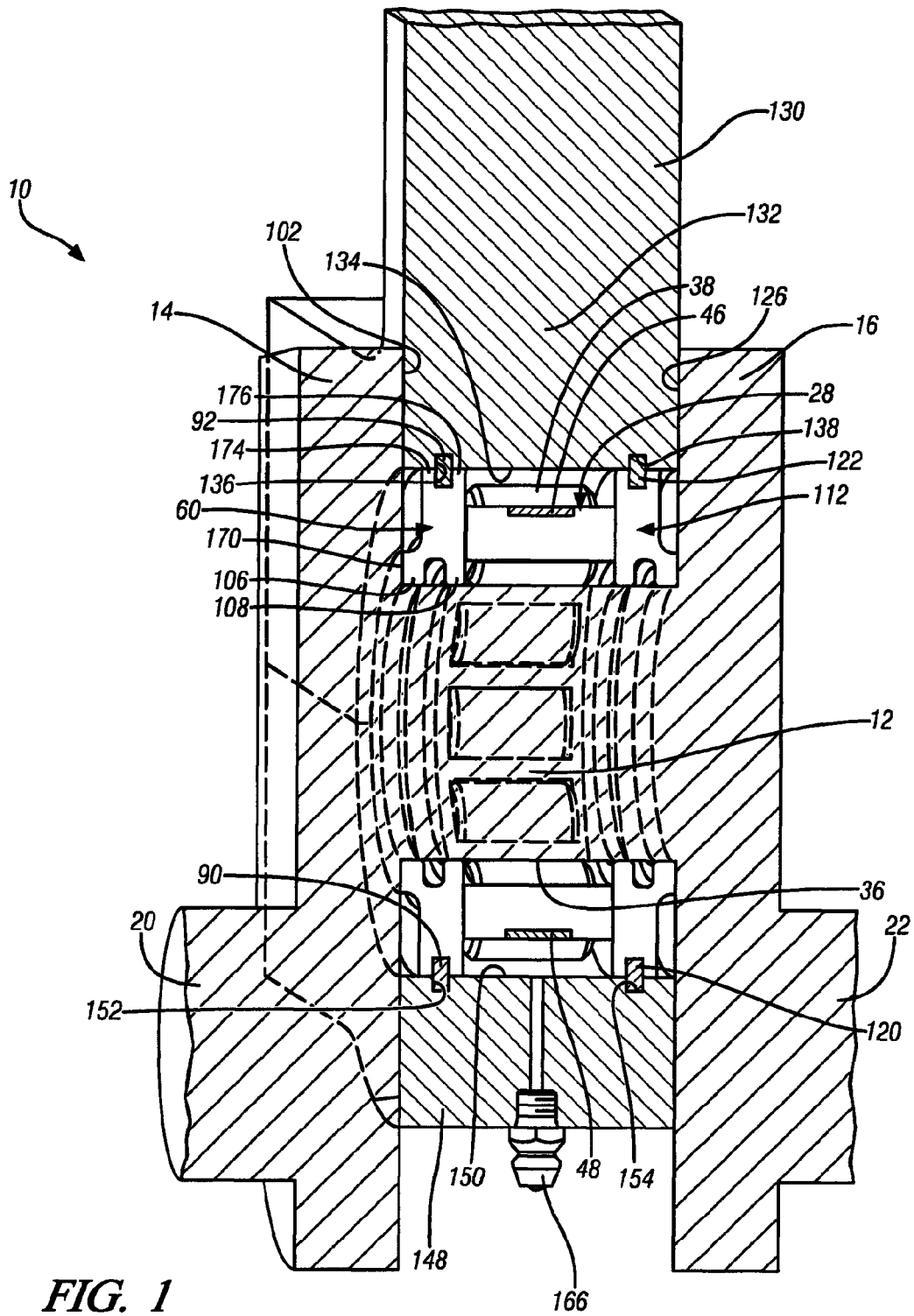
FIG. 1 is a section view taken through a crankshaft and showing a sealed split ring bearing assembly connecting a connecting rod to the crankshaft.

Referring to FIG. 1, a crankshaft indicated generally at 10 includes a crank pin 12 that is situated between a pair of webs 14 and 16. A crank pin 20 is connected to the web 14 and offset from the crank pin 12. Likewise, a crank pin 22 is connected to the web 16 and offset from the crank pin 12. A typical crankshaft will have 4 or 6 or 8 crank pins, one for each piston. A split ring bearing assembly generally indicated at 28, encircles the crank pin 12.

Figure 2:
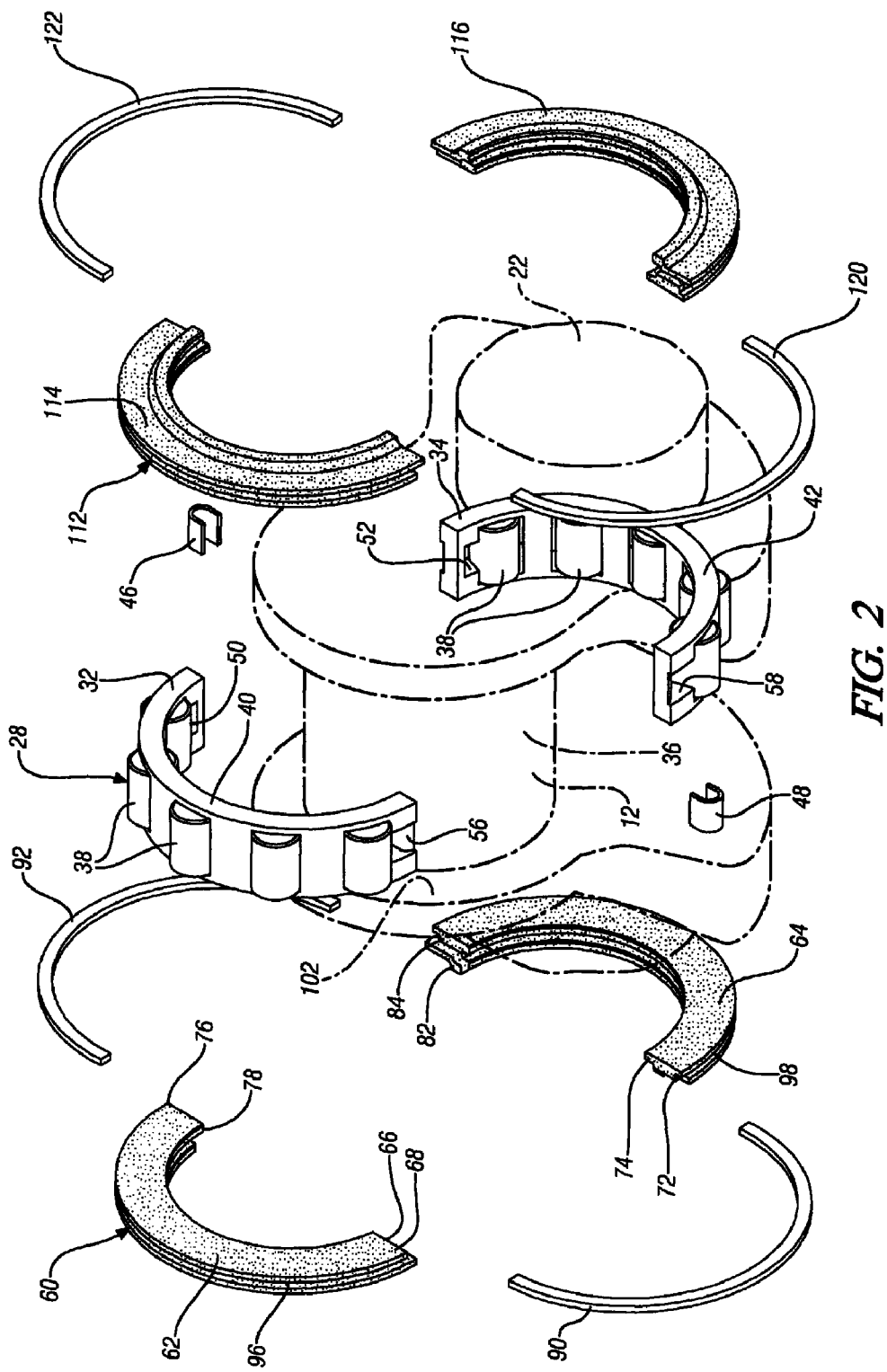
FIG. 2 is an exploded view showing the bearing assembly prior to its assembly onto the crankshaft.
Figure 3:
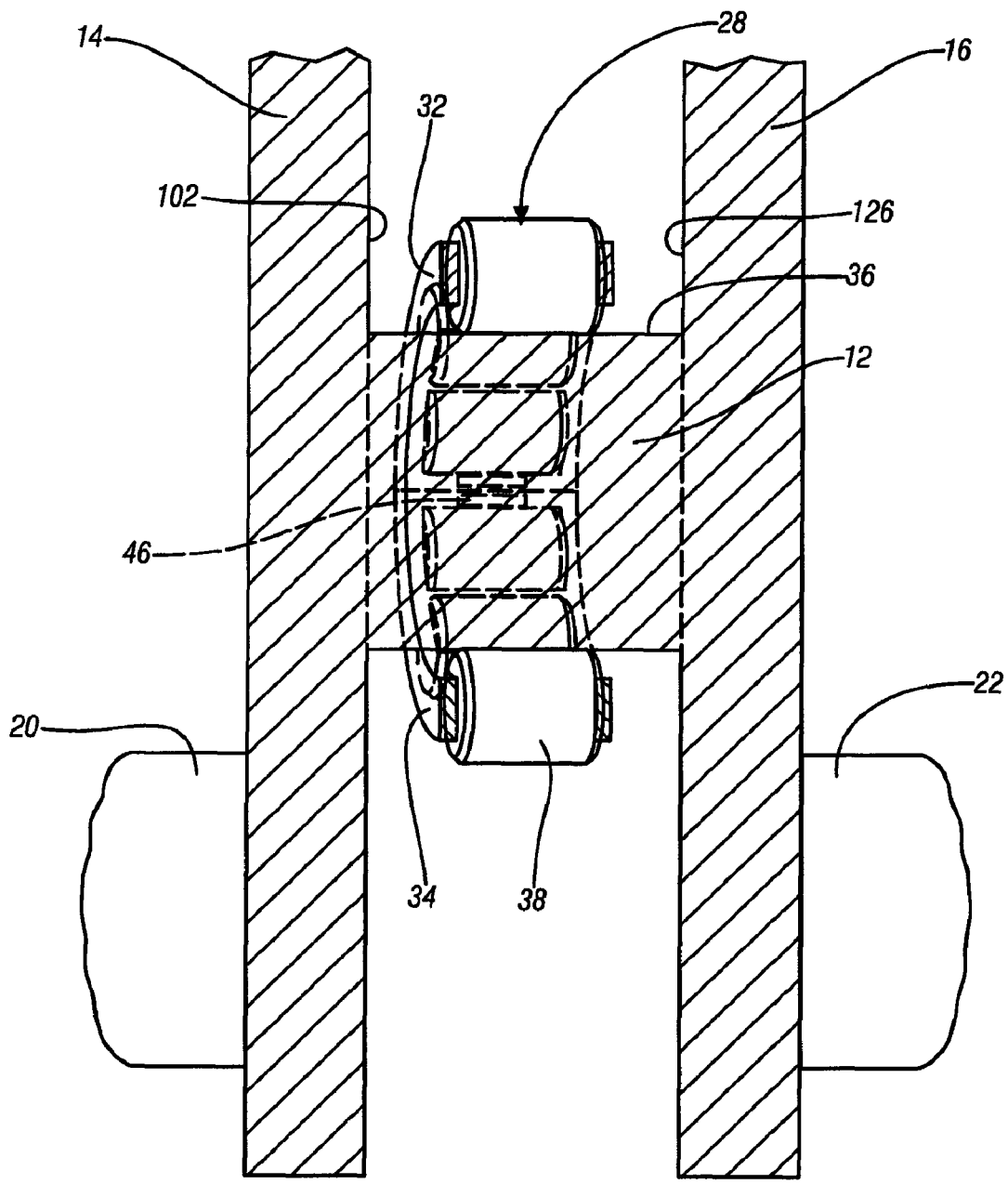
FIG. 3 is a view similar to FIG. 1 but showing the split ring bearing assembly having been mounted on the crankshaft.

As best seen in FIG. 2, the split ring bearing assembly 28 includes a first bearing part 32 and a second bearing part 34 that when joined together will encircle and bear upon a cylindrical outer surface 36 of the crank pin 12. In particular, as shown in FIG. 2, the first bearing part 32 has a plurality of roller bearings 38 which are housed within a bearing housing 40 that individually mounts the rollers 38 for rotation. Likewise, the second bearing part 34 has a plurality of bearings 38 which are housed within a bearing housing 42. The first bearing part 32 and the second bearing part 34 will be wrapped around the crank pin 12 as shown in FIG. 3. Then a first retaining clip 46, FIG. 2, will be installed into a clip receiving recess 50 provided on the end of the first bearing part 32 and a similar clip receiving recess 52 provided on the end of the second bearing part 34. Similarly, a second retaining clip 48 will be installed into a clip receiving recess 56 of the first bearing part 32 and a similar clip receiving recess 58 of the second bearing part 34. Accordingly, as seen in FIG. 3, by the installation of these retaining clips 46 and 48, the split ring bearing assembly 28, comprised of the two bearing parts 32 and 34 will be installed onto the crank pin 12 and retained thereon with the individual roller bearings 38 bearing upon the cylindrical surface 36 of the crank pin 12.

Referring again to FIGS. 1 and 2, and particularly FIG. 2, it is seen that a first split ring seal assembly, is provided and generally indicated at 60. The first split ring seal assembly 60, as best seen in FIG. 2, includes a first seal part 62 and a second seal part 64 that when joined together will encircle and sealingly contact with the cylindrical surface 32 of the crank pin 12. As seen in FIG. 2, an end 66 of the first seal part 62 has a groove arrangement 68 that will complementarily interlock with a mating groove arrangement 72 that is provided on end 74 of the second seal part 64. Likewise, the other end 76 of the first seal part 62 has a groove arrangement 78 that will mate with a complementary groove arrangement 82 that is provided on an end 84 of the second seal part 64.

Figure 4:
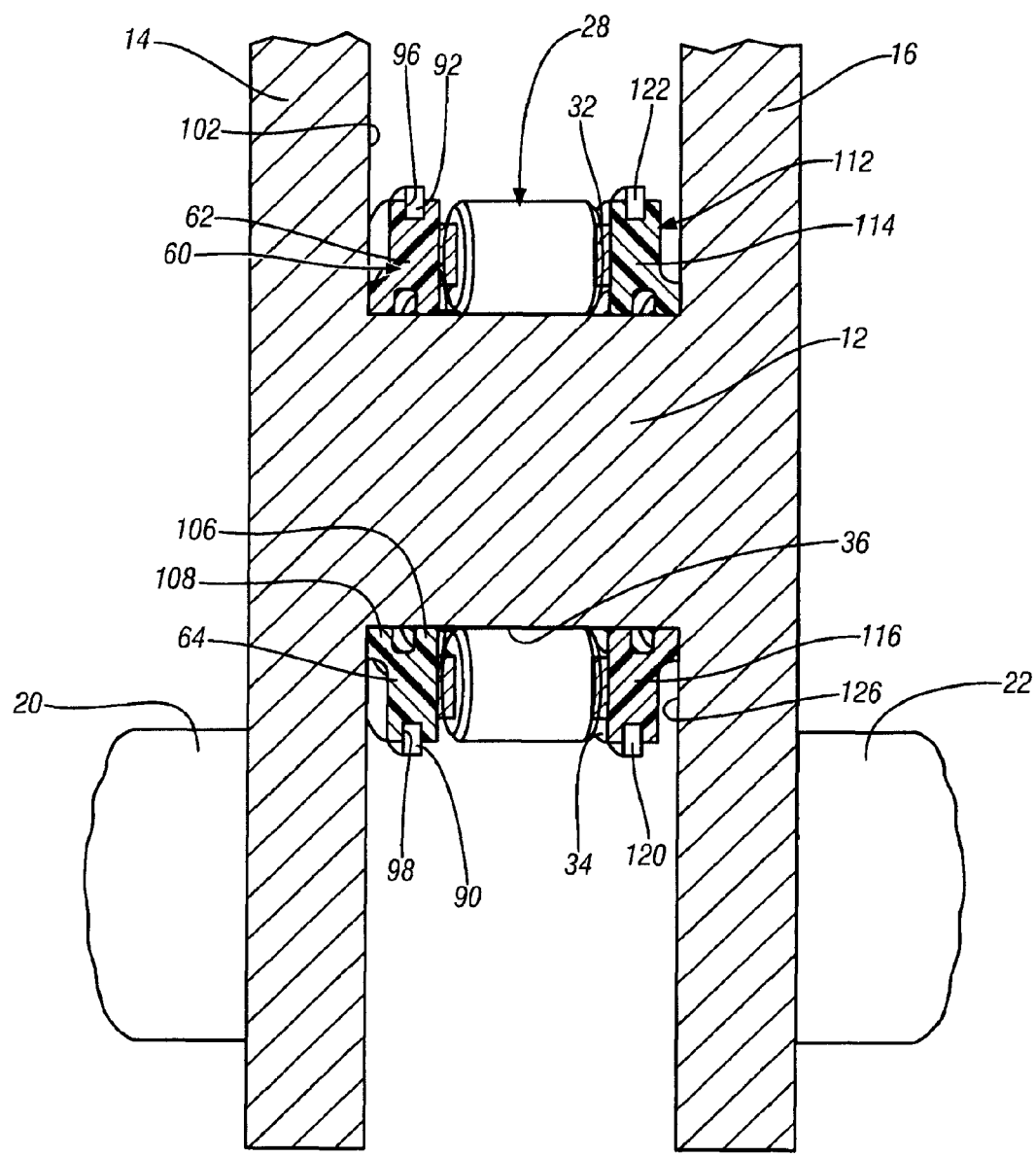
FIG. 4 is a view similar to FIG. 3 but shows the split ring seal assemblies having been added on each side of the split ring bearing assembly.

FIG. 4 shows the first seal assembly 60 installed onto the crank pin 12, it being understood that the complementary interlocking between the groove arrangements on the ends of the first seal part 62 and second seal part 64 will have provided a complementary sealing connection between the two seal parts 62 and 64. As seen in FIGS. 2 and 4, a first retaining ring 90 and a second retaining ring 92 will be installed within cylindrical peripherally extending retaining grooves 96 and 98 provided respectively in the first seal part 62 and the second seal part 64. As shown in FIG. 4, the installation of these retaining rings 90 and 92 will thereby retain the first seal part 62 and second seal part 64 together, thereby providing a unitary one-piece first seal assembly 60 that is seated between the split ring bearing assembly 28 and a cheek surface 102 of the crankshaft web 14. Also, as best seen in FIG. 4, it is seen that the first seal assembly 60 has inner lips 106 and 108 which bear sealingly upon the cylindrical surface 36 of the crank pin 12.

Referring again to FIGS. 2 and 4, it is seen that a second split ring seal assembly 112 is provided and includes a first seal part 114 and a second seal part 116 that will be retained together by a first retaining ring 120 and a second retaining ring 122. As seen in FIGS. 2 and 4, the seal parts 114 and 116 are identical to the seal parts 62 and 64 of the first seal assembly 60. As seen in FIG. 4, the second seal assembly 112 will be captured between the split ring bearing assembly 28 and a cheek surface 126 of the web 16 of the crankshaft 10.

Figure 5:
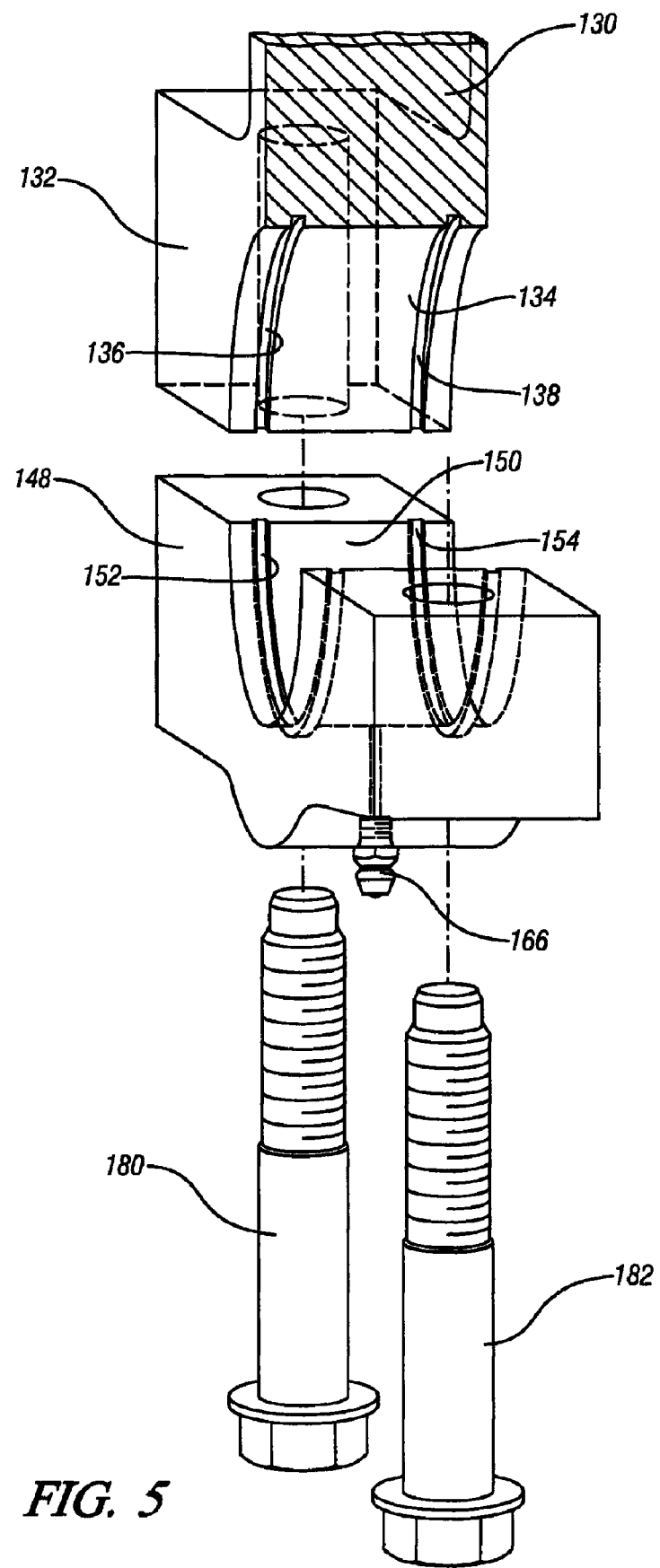
FIG. 5 is a perspective view showing the connecting rod and the connecting rod cap that will be installed onto the crankshaft to obtain the finished assembly of FIG. 1.

Referring now to FIGS. 1 and 5, it is seen that a connecting rod 130 includes a journal 132 having a cylindrical recess 134 adapted to surround and engage with the bearing assembly 28 and the first and second seal assemblies 60 and 112, as shown in FIG. 1. In particular, it is seen that the cylindrical recess 134 of the connecting rod 130 has a first seal receiving groove 136 and a second seal receiving groove 138, which will receive respectively the retaining rings 92 and 112 of the first and second seal assemblies 60 and 120.

Furthermore, as shown in FIG. 5, the connecting rod 130 includes a connecting rod cap 148 having a cylindrical recess 150. The cylindrical recess 150 has grooves 152 and 154 for receiving the retaining rings 90 and 120 of the first and second seal assemblies 60 and 112. The connecting rod cap 148 is attached to the connecting rod 130 by a pair of bolts 180 and 182 to provide the finished assembly that is shown in FIG. 1. Thus it is seen that the connecting rod 130 and its cylindrical recess 134, and the cap 148 and its cylindrical recess 150 cooperate to define the journal 132, with the connecting rod 130 providing one half of the journal and the cap 148 providing the other half of the journal.

After the components are assembled as shown in FIG. 1, lubricant is added through an alamite fitting 166 in order to provide a fill of lubrication to the bearing assembly 28. This lubricant is retained in the bearing 28 by the first seal assembly 60 and the second seal assembly 112. In particular, as shown in FIG. 1, the lips 106 and 108 of the first seal assembly 60 bear upon the cylindrical surface 36 of the crank pin 12. In addition, a radial extending end surface 170 of the first seal assembly 60 has sealing contact with the cheek surface 102 of the web 14. In addition, the outer periphery of the seal assembly 60 has a first lip 174 and a second lip 176 on opposite sides of the retaining ring 92, that have sealing contact with the cylindrical recess 134 of the connecting rod 130 and the cylindrical recess 150 of the connecting rod cap 148. The lubricant may be filled under pressure, in which case it is understood that the retaining rings will function to retain the position of the seal assembly axially along the cylindrical surface 36 of the crank pin 12.

It will be understood that the drawings herein show just one example of the implementation of the invention, and that various variations can be made within the scope thereof. For example, although the drawings show the bearings as being roller bearings, the bearings could be ball bearings.

Thus, it is seen that the invention provides a new and improved sealed split ring bearing and seal arrangement for a vehicle engine crankshaft. Although the example shown in the drawings is of the placement of the bearing and seal arrangements at the connection between the crankshaft and the connecting rod, the bearing and seal assembly hereof can also be provided to rotatably mount the crankshaft on the engine crankcase.

What is claimed is:

1. A low-friction sealed connection between a crankshaft and a journal, comprising:
    said crankshaft having a cylindrical surface;
    a split ring bearing assembly including a first bearing part and a second bearing part that when joined encircle the cylindrical surface, each bearing part having a plurality of bearing elements adapted to bear upon the cylindrical surface of the crankshaft;
    a first split ring seal assembly and a second split ring seal assembly, each including a first seal part and a second seal part that when joined encircle and sealingly contact with the cylindrical surface of the crankshaft, said first split ring seal assembly being installed on one side of the split bearing assembly and the second split ring seal assembly being installed on the other side of the split bearing assembly;
    first and second split retaining rings that extend into grooves provided in the first and second split ring seal assemblies to retain the seal assemblies;
    said journal including a first journal half having a cylindrical recess for receiving the crankshaft and a second journal half to capture the crankshaft in the cylindrical recess of the first journal half so that the bearing elements of the split ring bearing assembly bear upon the journal and the first and second split ring seal assemblies sealingly contact with the first journal half and the second journal half.

2. The low-friction sealed connection of claim 1 further comprising the bearing elements being either rollers or balls.

3. The low-friction sealed connection of claim 1 further comprising a lube fill fitting provided in the journal for the introduction of lubricant which is permanently sequestered between the first and second split ring seal assemblies to provide sealed lubrication of the split ring bearing assembly.

4. The low-friction sealed connection of claim 1 further comprising the first journal half being integral with a piston connecting rod and the second journal half being a connecting rod cap.

5. The low-friction sealed connection of claim 1 further comprising the first journal half being integral with an engaging crankcase and the second journal half being a cap that is bolted to the engine crankcase.

6. The low-friction sealed connection of claim 1 further comprising the first and second seal parts having ends and the ends having groove arrangements that mate with one another when the first and second seal parts encircle and sealingly contact with the cylindrical surface of the crankshaft.

7. The low-friction sealed connection of claim 1 further comprising the crankshaft having cheeks spaced apart along the cylindrical surface, and the first and second seal assemblies having sealing contact with the cheeks of the crankshaft.

8. The low-friction sealed connection of claim 1 further comprising retaining clips that connect together the first bearing part and the second bearing part so that the bearing assembly is thereby assembled and retained upon the cylindrical surface of the crankshaft.

9. The low-friction sealed connection of claim 8 further comprising the first journal half and the second journal half having retaining grooves therein in which seal retaining rings are engaged to retain the split ring seals against movement along the axis of the cylindrical surface.

10. A low-friction sealed connection between a crankshaft and a journal, comprising:
    said crankshaft having spaced apart cheeks and a cylindrical surface disposed between the cheeks;
    a split ring bearing assembly including a first bearing part and a second bearing part that when joined encircle the cylindrical surface, each bearing part having a plurality of bearing elements adapted to bear upon the cylindrical surface of the crankshaft;
    a first split ring seal assembly and a second split ring seal assembly, each including a first seal part and a second seal part that when joined encircle and sealingly contact with the cylindrical surface of the crankshaft, said first split ring seal assembly being installed on one side of the split bearing assembly and the second split ring seal assembly being installed on the other side of the split bearing assembly;
    said journal including a first journal half having a cylindrical recess for receiving the crankshaft and a second journal half to capture the crankshaft in the cylindrical recess of the first journal half so that the bearing elements of the split ring bearing assembly bear upon the journal and the first and second split ring seal assemblies sealingly contact with the first journal half and the second journal half;
    first and second split retaining rings that extend into grooves provided in the first journal half and the second journal half and extend into grooves provided in the first and second split ring seal assemblies to retain the seal assemblies;
    and a lube fill fitting provided in the journal for the introduction of lubricant which is permanently sequestered between the first and second split ring seal assemblies to provide sealed lubrication of the split ring bearing assembly.

11. The low-friction sealed connection of claim 10 further comprising the bearing elements being rollers.

12. The low-friction sealed connection of claim 10 further comprising the bearing elements being balls.

13. The low-friction sealed connection of claim 10 further comprising the first journal half being integral with a piston connecting rod and the second journal half being a connecting rod cap.

14. The low-friction sealed connection of claim 10 further comprising the first journal half being integral with an engaging crankcase and the second journal half being a cap that is bolted to the engine crankcase.

15. The low-friction sealed connection of claim 10 further comprising the first and second seal parts having ends and the ends having groove arrangements that mate with one another when the first and second seal parts encircle and sealingly contact with the cylindrical surface of the crankshaft.

16. The low-friction sealed connection of claim 10 further comprising the first and second seal assemblies having contact with the cheeks of the crankshaft to retain the seal assemblies.

17. The low-friction sealed connection of claim 10 further comprising retaining clips that connect together the first bearing part and the second bearing part so that the bearing assembly is thereby assembled and retained upon the cylindrical surface of the crankshaft.

18. A low-friction sealed connection between a crankshaft and a journal, comprising:
    said crankshaft having spaced apart cheeks and a cylindrical surface disposed between the cheeks;
    a split ring bearing assembly including a first bearing part and a second bearing part that when joined encircle the cylindrical surface, each bearing part having a plurality of bearing elements adapted to bear upon the cylindrical surface of the crankshaft;
    a first and second clip attaching the first bearing part and second bearing part of the split ring bearing assembly;
    a first split ring seal assembly and a second split ring seal assembly, each including a first seal part and a second seal part that when joined encircle and sealingly contact with the cylindrical surface of the crankshaft, said first split ring seal assembly being installed on one side of the split bearing assembly and the second split ring seal assembly being installed on the other side of the split bearing assembly, and said first and second seal parts having ends and the ends having groove arrangements that mate with one another when the first and second seal parts encircle and sealingly contact with the cylindrical surface of the crankshaft;
    said journal including a first journal half having a cylindrical recess for receiving the crankshaft and a second journal half to capture the crankshaft in the cylindrical recess of the first journal half so that the bearing elements of the split ring bearing assembly bear upon the journal and the first and second split ring seal assemblies sealingly contact with the first journal half and the second journal half;
    first and second split retaining rings that extend into grooves provided in the first journal half and the second journal half and grooves provided in the first and second split ring seal assemblies to retain the seal assemblies;
    and a lube fill fitting provided in the journal for the introduction of lubricant which is permanently sequestered between the first and second split ring seal assemblies to provide sealed lubrication of the split ring bearing assembly.

19. The low-friction sealed connection of claim 18 further comprising the bearing elements being rollers.

20. The low-friction sealed connection of claim 18 further comprising the bearing elements being balls.

* * * * *